Jan. 19, 1954
L. R. BLOOM
2,666,619
HYDRAULIC JACK SYSTEM FOR AUTOMOBILES
Filed Sept. 5, 1952
2 Sheets-Sheet 1
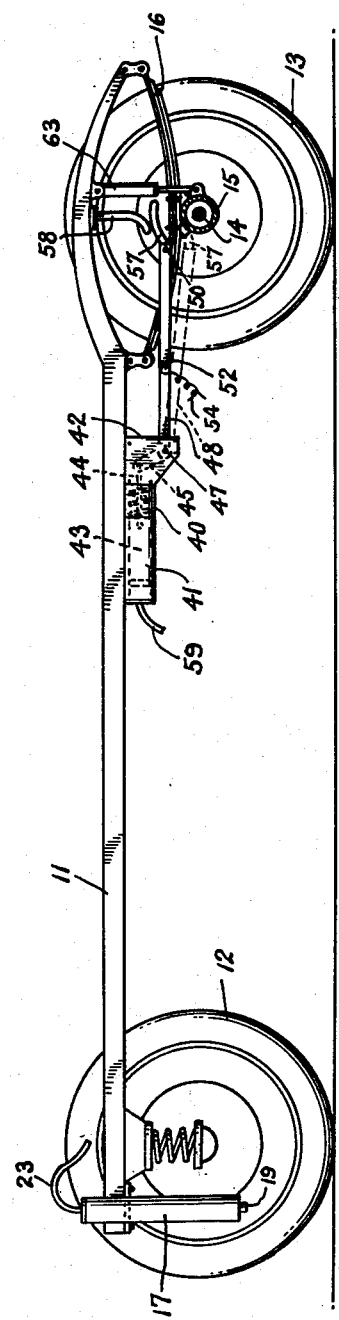
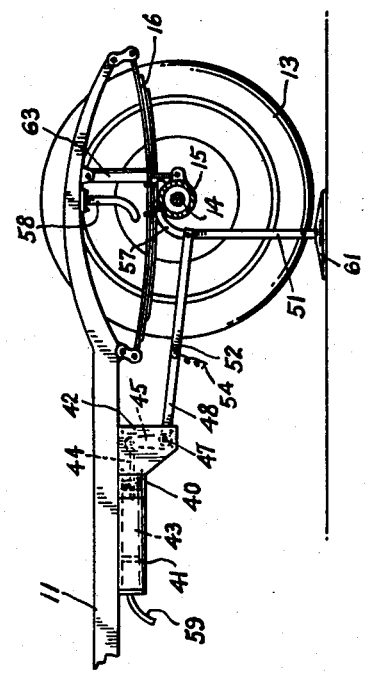
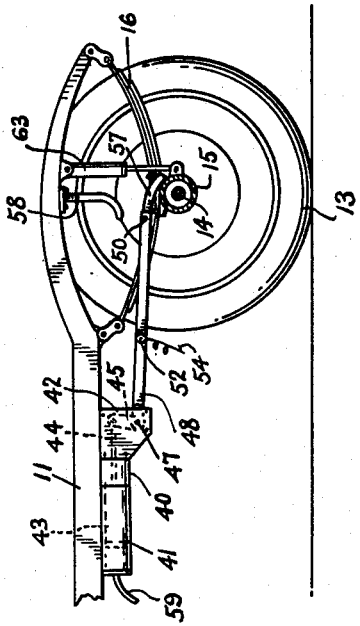
INVENTOR.
Louis R. Bloom
BY
McMorrow, Berman + Davidson
Attorneys.

Jan. 19, 1954  L. R. BLOOM  2,666,619
HYDRAULIC JACK SYSTEM FOR AUTOMOBILES
Filed Sept. 5, 1952  2 Sheets-Sheet 2
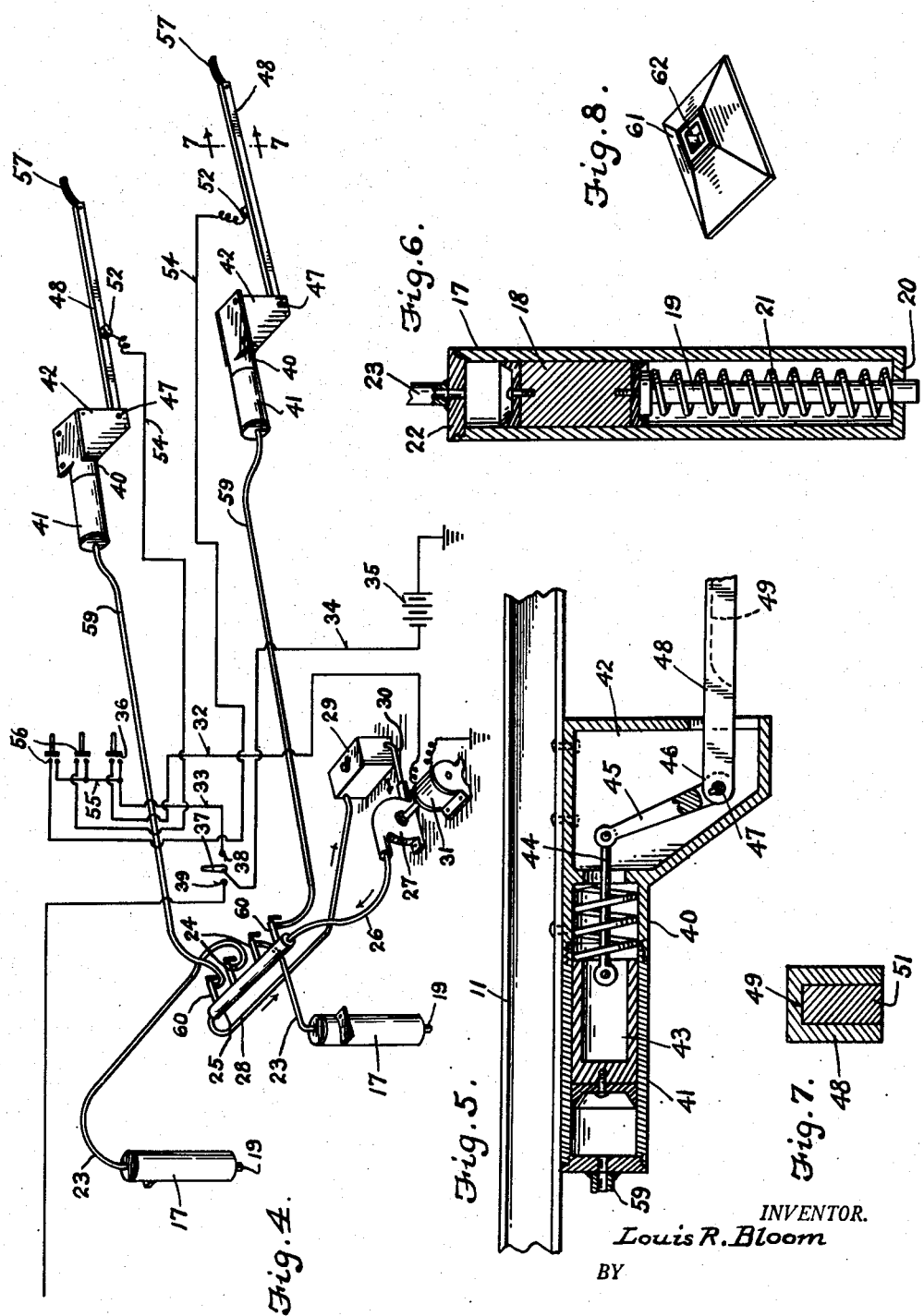
INVENTOR.
Louis R. Bloom
BY
McMorrow, Berman + Davidson
Attorneys.

Patented Jan. 19, 1954

2,666,619

UNITED STATES PATENT OFFICE 2,666,619

HYDRAULIC JACK SYSTEM FOR AUTOMOBILES

Louis R. Bloom, Fort Collins, Colo.

Application September 5, 1952, Serial No. 307,967

2 Claims. (Cl. 254—86)

This invention relates to improvements in a permanently installed hydraulic jack system for automobiles.

The main object of the invention is to provide a novel and improved hydraulically operated vehicle jack system for permanent installation on a vehicle and which is arranged to selectively lift the vehicle body relative to the wheels of the vehicle or alternatively, to lift the vehicle body and wheels simultaneously off the ground.

A further object of the invention is to provide an improved hydraulically operated vehicle jack system which is permanently installed on a vehicle, the system involving inexpensive components, being easy to install, and being reliable in operation.

A still further object of the invention is to provide an improved hydraulically operated vehicle jack system which is adapted to be permanently installed on a motor vehicle, the components of the system being durable in construction, being easy to maintain in operating condition, and providing a substantial saving in time and labor in lifting the vehicle body or the vehicle wheels when performing servicing operations on a vehicle.

Further objects and advantages of the invention will become apparent from the following description and claims, and from the accompanying drawings, wherein:

Figure 1 is a side elevational view, partly in longitudinal cross section, showing the chassis frame of a motor vehicle provided with an improved hydraulically operated jack system according to the present invention.

Figure 2 is a view of the rear portion of the structure shown on Figure 1 showing the rear lifting jack arranged to provide lifting of the vehicle body relative to the rear wheel of the vehicle.

Figure 3 is a view similar to Figure 2 but showing the rear jack arranged to provide lifting of the vehicle body and wheel simultaneously off the ground.

Figure 4 is a schematic view of the hydraulic jack system showing the hydraulic connections and also showing the wiring details of the electrical portions of the system.

Figure 5 is an enlarged vertical longitudinal cross sectional detail view taken through the hydraulic cylinder and the associated elements of the rear jack structure shown in Figures 2 and 3.

Figure 6 is an enlarged vertical cross sectional view taken through one of the vertical front hydraulic jack elements employed in the improved jack system shown in Figures 1 to 4.

Figure 7 is an enlarged transverse vertical cross sectional view taken on the line 7—7 of Figure 4.

Figure 8 is a perspective view of the removable ground engaging foot employed in the structure shown in Figure 3.

Referring to the drawings, 11 designates the chassis frame of a conventional motor vehicle which is adapted to be mounted in a conventional manner. The front wheels of the vehicle are designated at 12 and the rear wheels are designated at 13. The rear wheel axle is designated at 14, said axle being mounted in the usual axle housing 15. The rear portion of frame 11 is resiliently connected to and supported on the rear axle housing 15 by conventional leaf springs 16.

Secured to the forward portion of the frame 11 inwardly adjacent each front wheel 12 is a vertically arranged cylinder 17, each cylinder 17 having slidably positioned therein a piston 18 to which is axially connected a jack rod 19 which extends slidably through a central aperture formed in the bottom end wall 20 of the cylinder 17. Surrounding the rod 19 is a coil spring 21 which is compressed between the bottom wall 20 and the piston 18 to bias the piston 18 upwardly and to bias the jack rod 19 toward a substantially retracted position in the cylinder 17. Connected to the top wall 22 of the cylinder is a conduit 23 through which fluid under pressure may be forced into the top portion of the cylinder 17, whereby the piston 18 may be urged downwardly, causing the jack rod 19 to become lowered and to engage the ground, whereby the forward portion of the vehicle may be elevated. The conduits 23 are connected to respective manually operated valves 24 connected to an elongated cylindrical fluid chamber 25 having one end thereof connected by a conduit 26 to the outlet of a pump 27 and having its other end connected by a conduit 28 to a fluid reservoir 29. The reservoir 29 is connected by a conduit 30 to the inlet of the pump 27.

The valves 24 are conventional in construction and form no part of the present invention. Said valves are arranged in one position to connect the conduits 23 to the fluid chamber 25. When the pump 27 is operating, the fluid under pressure will flow through the conduits 23 of a selected cylinder 17 and move its piston 18 downwardly. When the pump 27 is stopped, the pressure in the chamber 25 will drop and the fluid will discharge into the reservoir 29, allowing the spring 21 of the cylinder 17 to move its piston 18 to the retracted upper position shown in Figure 6. The fluid will thus be discharged from the cylinder 17 to the conduit 23 and back through the chamber 25 and the conduit 28 into the reservoir 29.

The pump 27 is driven by an electric motor 31 whose energizing circuit includes the wires 32, 33 and 34, said circuit including the battery 35, the push-button switch 36 and the pole 37 of a key-operated single pole double throw switch having the stationary contacts 38 and 39. With pole 37 engaging the contact 38, the motor 31 becomes energized when the push-button switch 36 is actuated, since this completes the energizing circuit of said motor and connects said motor to the battery 35. When the switch key is out the pole 37 is in the open circuit position shown in Figure 4.

Secured to the underside of the rear portions of frame 11 adjacent the respective rear wheels 13 are respective brackets 40, each bracket structure being formed to define a longitudinally extending cylinder portion 41 and an enlarged rear housing 42. Slidably positioned in each cylinder portion 41 is a piston 43 which is connected by a connecting rod 44 to one end of one of the arms 45 of a bell crank lever 46 which is pivotally mounted by a transverse shaft 47 between the side walls of the housing 42 of the bracket 40. The other arm of the bell crank lever is designated at 48, and is longitudinally recessed at 49. Pivoted to the rear end of the crank arm 48 at 50 is a jack bar 51 which is receivable in the recess 49, as shown in Figure 7. Designated at 52 is a latch member provided with a movable detent element engageable in a suitable recess or opening formed in the jack bar 51 to retain said jack bar in housed position in the crank arm 48, the latch member 52 being mounted on the arm 48. Latch member 52 is electro-magnetically controlled and includes a solenoid which may be energized to retract the detent element of latch member 52 and release the jack bar 51. Said solenoid is provided with an energizing circuit including the wires 54, 55, 33 and 34, and also including the battery 35, the switch blade 37 and a push-button control switch 56, one push-button switch 56 being provided for the latch solenoid associated with the arm 48 of the jack structure provided for each of the rear wheels 13. Normally, the jack bar 51 is rigidly locked to its associated crank arm 48. When the control switch 56 associated with the associated electro-magnetic locking member 52 is closed, the electro-magnetic latch member releases and the jack bar 51 drops to a substantially vertical position, such as shown in Figure 3.

As shown in Figures 1 and 2, each jack bar 51 is provided at its upper end with a curved foot 57 which normally overlies the rear axle housing 15. Rigidly secured to the rear portion of the chassis frame 11 over the rear end of each crank arm 48 is a depending curved stop bar 58 which limits upward movement of the associated crank arm 48.

The closed rear end of each cylinder portion 41 is connected by a conduit 59 through a control valve 60 to the fluid chamber 25, whereby flow of hydraulic fluid to the cylinders 41 may be controlled in the same manner as the cylinders 17. With the parts in normal position, as shown in Figure 1, and the jack bars 51 locked, the rear portion of the chassis frame 11 adjacent either rear wheel 13 may be elevated relative to the wheel by admitting fluid under pressure into the associated cylinder 41. The fluid under pressure acts to move the piston 43 rearwardly, causing the bell crank lever 46 to be rotated clockwise, as viewed in Figure 5, whereby the foot portion 57 of the associated jack bar exerts a downward force upon the axle housing 15 and therefore elevates the portion of frame 11 immediately thereabove. This may be accomplished by opening the proper valve 60, and by engaging the switch blade 37 with the contact 38, and then closing the pump control switch 36.

When it is desired to elevate either of the rear wheels 13, for a servicing operation such as for changing a tire or the like, a jack bar 51 associated with the rear wheel to be elevated is released by closing the proper switch 56, thus energizing the associated electro-magnetic latch member 52. With the solenoid of the latch member 52 energized, the detent element associated therewith is retracted and the jack bar 51 falls by gravity to a substantially vertical position, such as shown in Figure 3. A ground engaging base member 61 is then engaged on the end of the strut member 51, said base member 61 being provided with a central socket 62 to receive the end of the jack bar. Fluid under pressure is then forced into the cylinder 41 associated with the released jack bar by energizing the pump 27 in the manner above described, namely by closing switch 36. The fluid under pressure forced into the cylinder 41 acts on the piston 43 and rotates the bell crank lever 46 clockwise, as viewed in Figure 5, causing the jack bar 51 to be urged downwardly and to thereby exert a lifting force which is transmitted by the crank arm 48 and the bracket structure 40 to the chassis frame 11, causing both said frame and the rear wheel 13 to be elevated, as illustrated in Figure 3.

As shown in Figure 4, the contact 39 of the double throw single pole switch is connected to the automobile engine ignition circuit so that the ignition circuit must remain open while the switch pole 37 is engaged with the contact 38. The battery 35 is the automobile battery ordinarily employed to energize the automobile ignition circuit. It will be apparent from Figure 4 that with the switch blade 37 engaged with the contact 38, the ignition circuit is open and the vehicle engine must be inactive. This insures that the vehicle engine is cut off when the jack elements are operated.

As shown in Figure 3, when the jack bar 51 is employed for lifting a rear wheel, the rear wheel 13 is lifted when the chassis frame 11 is elevated because of the connection of the rear wheel to the frame through the leaf spring assembly 16 and through the associated conventional shock absorber assembly 63 yieldingly connecting the frame 11 to the axle housing 15.

The fluid chamber 25, the manually controlled valves 24 and 60 connected thereto and the key-operated main switch may be arranged as a unit in a suitable housing and may be mounted in any convenient portion of the vehicle, such as, for example, on or adjacent to the instrument panel or dashboard of the vehicle.

While a specific embodiment of an improved lift system for motor vehicles has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In combination, a vehicle chassis frame having a longitudinal side member, an axle housing beneath and extending across said side member, resilient means mounting the side member on the axle housing, a bracket fixed on said side member comprising a longitudinal hydraulic cylinder and a housing at one end of the cylinder, a piston working in the cylinder having a connecting rod projecting into said housing, a bellcrank pivoted intermediate its ends on said housing, said bellcrank having a first crank arm having a free end pivoted to said connecting rod and a second crank arm having a free end, a jack bar having a lower end arranged to operatively engage the ground beneath said axle housing and an upper end, means pivoting the free end of the second crank arm to said jack bar at a point near the upper end of the jack bar, a lateral foot on the upper end of the jack bar arranged to supportingly engage over the axle housing in an upwardly pivoted and retracted position of the jack bar, retracting means normally urging said piston toward one end of said piston and through said bellcrank positioning said jack arm in an elevated and retracted position, and hydraulic means connected to said cylinder and operable to urge said piston toward the opposite end of the cylinder and operating through said ballcrank to pivot said jack bar away from the axle housing and disengage said foot from the axle housing and free the jack bar to fall into a vertical position with its lower end engaged with the ground and to move further downwardly relative to the rear axle so as to lift the chassis frame and the rear axle relative to the ground.

2. In combination, a vehicle chassis frame having a longitudinal side member, an axle housing beneath and extending across said side member, resilient means mounting the side member on the axle housing, a bracket fixed on said side member comprising a longitudinal hydraulic cylinder and a housing at one end of the cylinder, a piston working in the cylinder having a connecting rod projecting into said housing, a bellcrank pivoted intermediate its ends on said housing, said bellcrank having a first crank arm having a free end pivoted to said connecting rod and a second crank arm having a free end, a jack bar having a lower end arranged to operatively engage the ground beneath said axle housing and an upper end, means pivoting the free end of the second crank arm to said jack bar at a point near the upper end of the jack bar, a lateral foot on the upper end of the jack bar arranged to supportingly engage over the axle housing in an upwardly pivoted and retracted position of the jack bar, retracting means normally urging said piston toward one end of said piston and through said bellcrank positioning said jack arm in an elevated and retracted position, and hydraulic means connected to said cylinder and operable to urge said piston toward the opposite end of the cylinder and operating through said bellcrank to pivot said jack bar away from the axle housing and disengage said foot from the axle housing and free the jack bar to fall into a vertical position with its lower end engaged with the ground and to move further downwardly relative to the rear axle so as to lift the chassis frame and the rear axle relative to the ground, and latch means active between said jack bar and said second crank arm of the bellcrank when the jack bar is in an elevated and retracted piston with its foot engaged with the rear axle housing and then serving to lock the jack bar against pivotal movement relative to the bellcrank, operation of said piston toward said opposite end of the cylinder by said hydraulic means serving to lift the chassis frame relative to the axle housing.

LOUIS R. BLOOM.

References Cited in the file of this patent
UNITED STATES PATENTS

| Number | Name | Date |
|---|---|---|
| 1,193,570 | Lohmiller | Aug. 8, 1916 |
| 2,143,184 | Barr | Jan. 18, 1939 |
| 2,249,356 | Goodman | July 15, 1941 |
| 2,545,493 | Richter | Mar. 20, 1951 |